Figure 1B:
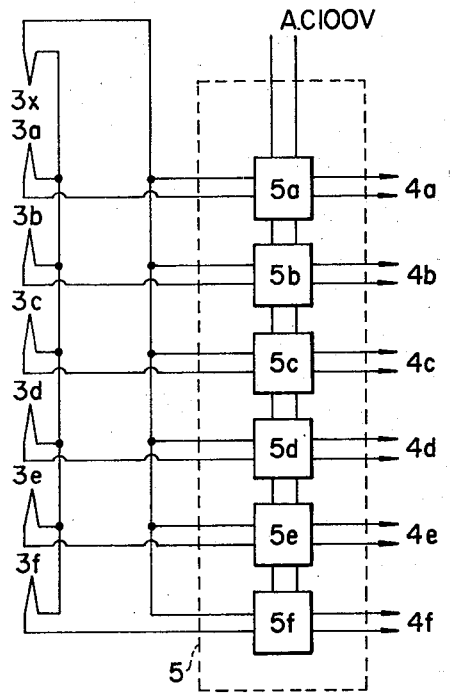

United States Patent [19]
Hosoi

[11] 3,830,622
[45] Aug. 20, 1974

[54] METHOD AND APPARATUS FOR BRAZING ALUMINUM AND ITS ALLOYS WITHIN A VACUUM HEATING FURNACE

[75] Inventor: Kazuo Hosoi, Tokyo, Japan

[73] Assignee: Japan Oxygen Co., Ltd., Minato-ku, Tokyo, Japan

[22] Filed: May 14, 1973

[21] Appl. No.: 359,943

[52] U.S. Cl. .................. 432/12, 236/15 B, 432/36, 432/52
[51] Int. Cl. ............................................ F27b 5/06
[58] Field of Search .................. 432/12, 36, 51, 52; 236/78 B, 15 B

[56] References Cited
UNITED STATES PATENTS
1,775,682   9/1930   Martin .............................. 236/15 B
1,893,847   1/1933   Simpson ........................... 236/15 B

*Primary Examiner*—John J. Camby
*Attorney, Agent, or Firm*—Browne, Beveridge, DeGrandi & Kline

[57] ABSTRACT

Brazing of complex structures of aluminum metal or its alloys is performed within a vacuum heating furnace in a continuous sequence of heating stages, each having an upper limit temperature by utilizing detected temperature differentials between body surface and interior locations later heated by radiation, for control of the heating rate so that the rate decreases from stage to stage.

8 Claims, 4 Drawing Figures

PATENTED AUG 20 1974

3,830,622

METHOD AND APPARATUS FOR BRAZING ALUMINUM AND ITS ALLOYS WITHIN A VACUUM HEATING FURNACE

The present invention relates to a method and apparatus for brazing aluminum metal and its alloys within a vacuum heating furnace, more particularly related to a method and apparatus for brazing aluminum metal and aluminum alloy bodies of large size and complicated surface shapes within a vacuum heating furnace, to the uniform heating of the same up to a prescribed temperature.

It is known in general that, when a body is heated up to a certain temperature of destination, there is developed a gap between the surface temperature and interior temperature of the body. Particularly in the case of a body of a relatively low heat conductivity in which heat flows not so much, such development of temperature gap takes place remarkably. Large development of temperature gap during the heating process inevitably causes poor uniformity in the temperature distribution on and in the body and, possibly, local melting of the body, while leading to the lowering in the quality of the product obtained. In order to obviate such trouble, it is proposed to carry out the heating process through adjustment of quantity of heat emitted by heat sources of the heating furnace on the basis of the detection of the temperature of the body, e.g. surface temperature(s) or interior temperature of the body under heat application. However, even such measure provides no perfect solution to the above mentioned process trouble.

For example, in case when the quantity of heat emitted by the heat sources is adjusted on the basis of detection of the body surface temperature, the body interior temperature cannot be escalated smoothly and, therefore, although the body surface temperature can be maintained at a prescribed temperature level, a relatively long period is needed before the body can be uniformly heated up to the prescribed temperature of destination. Therefore, in order to accelerate the temperature escalation of the body, it is required to employ a high surface temperature of the body. On the other hand, when the quantity of heat emitted by the heat sources is to be adjusted in reference to the interior temperature of the body, the surface temperature of the body is extremely escalated leading to undesirable melting of the body surface part before the interior temperature of the body reaches the prescribed temperature level of destination.

When such bodies of complicated shapes such as heat exchangers made up of aluminum metal or aluminum alloys are to be subjected to brazing operation, it is most difficult to fix the locations on and/or in the body to which the thermometer elements are to be optimumly disposed. In other words, the optimum locations of the thermometer elements disposition should vary from body to body in order to have the best heat control effect for the respective bodies. Usually selection of such optimum locations of the thermometer elements disposition is carried out on the basis of the empirical knowledge only and, therefore, control of the heating process under such situation requires highly trained skillfulness of the operators in charge of the work. Therefore, the operation includes so many indefinite factors lacking in precise control on heating procedures and, in addition, the quality of the products obtained through such brazing is lowered seriously.

The principal object of the present invention is to provide method and apparatus for brazing aluminum metal and its alloy bodies within a vacuum heating furnace with temperature control for uniformity of the body interior temperatures.

Another object of the present invention is to provide method and apparatus for brazing aluminum metal or its alloy bodies within a vacuum heating furnace with remarkably enhanced operational preciseness.

An other object of the present invention is to provide method and apparatus for brazing aluminum metal and its alloy bodies within a vacuum heating furnace for manufacturing of products of remarkably enhanced quality with easiness in the operational procedure.

A further object of the present invention is to provide method and apparatus for brazing aluminum metal or its alloy bodies within a vacuum heating furnace with proper control on the thermal disposition over a long period without regard to the operators skillfulness.

In the method of the present invention, surface temperatures of the body under application of heat are detected at locations selected on the surface of the body which confront corresponding heat sources, a temperature of the body is concurrently detected at an inside location of the body whereat the heat conducted from the body surface arrives latest and the first mentioned surface temperatures and the second mentioned temperature detected at the inside location are compared to each other. When gaps between the compared temperatures exceed prescribed limits, corresponding signals are produced and quantities of heat emitted by the corresponding heat sources are adjusted in response to the signals so produced. Such adjustment of quantities of heat is cancelled when the average temperature of the body approaches a prescribed reference temperature level and the body is further heated to a temperature level of destination above the above mentioned prescribed reference temperature level. This last staged heating process is carried out on the basis of temperature adjustment through detection of the body surface temperatures only.

For a further precise control of the heating process, one or more subordinated reference temperature levels are advantageously prescribed selected below the above mentioned reference temperature level. In this case, different temperature gap limit for causing production of the signals are selected for different temperature regions defined by the reference temperature level and the subordinate reference temperature levels. It is also desirable that the higher is the temperature region, the smaller is the above mentioned temperature gap limit.

In the apparatus of the present invention, one or more thermometer elements are disposed to the body at locations on the body surface in an arrangement confronting corresponding heaters which are disposed on the inside walls of the heating furnace. Forming separate couples with these surface thermometer elements, an inner thermometer element is disposed to the body at an inside location of the body whereat the heat conducted from the body surface arrives latest. A heat controller is provided with a plurality of temperature adjusters whose signal input terminals are separately connected to the separate couples of the thermometer elements and the temperature adjusters are further connected to a given AC electric source. Signal output terminals of the respective temperature adjusters of the temperature controller are connected to the corresponding heaters.

In a preferred embodiment of the apparatus according to the present invention, each of the temperature adjusters of the temperature controller is accompanied with two or more sets of different temperature adjuster circuits which are automatically and selectively rendered operative at different average temperatures of the body and have different temperature gap limits.

Figure 1A:
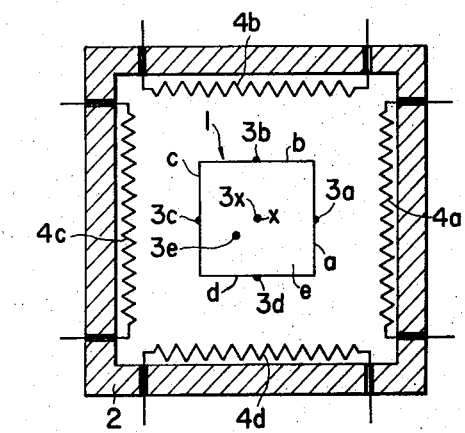
Figure 2:
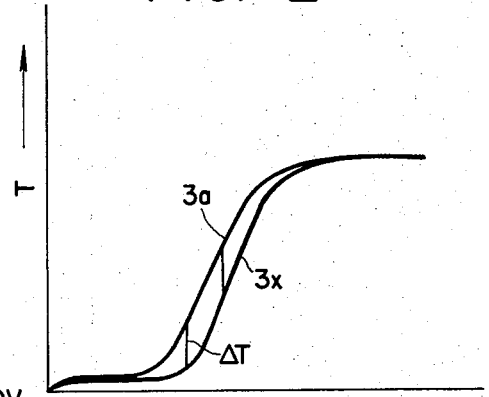
Figure 3:
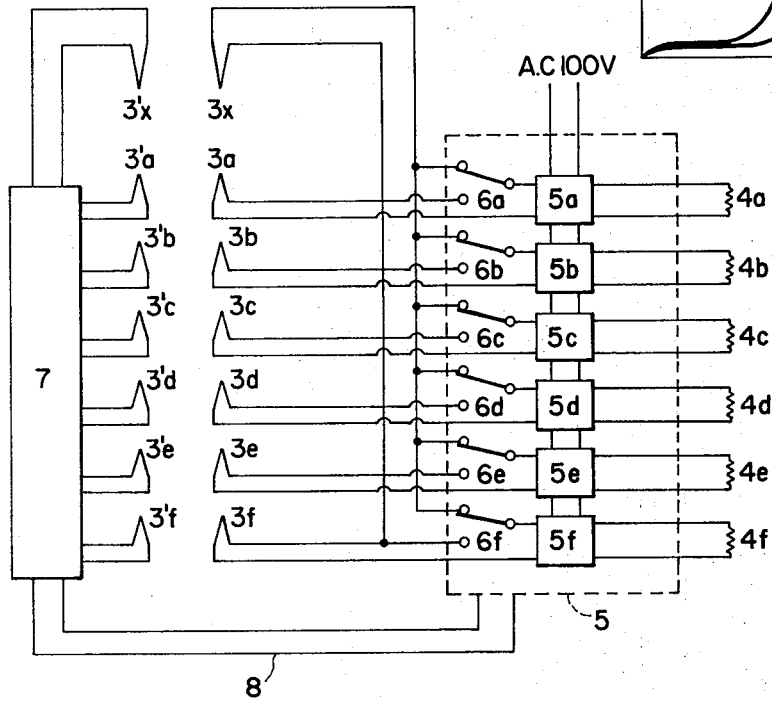

Further features, operations and merits of the present invention will be made more apparent from the ensuing description, reference being made to the embodiment shown in the accompanying drawings, in which:

FIG. 1A is a side sectional plan view of a heating furnace according to the present invention, in which a body to be heated in placed, FIG. 1B is a block diagram of a part of a system for controlling temperature according to the present invention, FIG. 2 is a graphical drawing for showing escalation of temperature of a body under heating according to the present invention, and FIG. 3 is a block diagram of the temperature control system in the brazing of aluminum metal or its alloy bodies according to the present invention.

Referring to FIG. 1A, there is shown a heating furnace 2 in which a hexahedral body 1 to be heated is placed, the body 1 having six rectangular surfaces $a$, $b$, $c$, $d$, $e$ and $f$. This hexahedral body 1 is accompanied with six sets of thermometer elements $3a$ to $3f$ disposed on its six surfaces $a$ to $f$, respectively. In addition to those thermometer elements $3a$ to $3f$ on the surfaces, another thermometer $3x$ is placed near the center of the body 1, i.e. near a place inside the body 1 whereat the heat conducted from the surfaces arrive latest. In the following description, for the sake of simplification in the explanation, the thermometer elements $3a$ to $3f$ on the surface of the body 1 will be referred to as "the outer thermometer elements" while the thermometer element $3x$ placed near the center of the body 1 will be referred to as "the inner thermometer element."

The respective thermometer elements, including the inner thermometer element $3x$ too, are connected to a temperature controller 5 for transmission of temperature signals in a manner such as shown in FIG. 1B. The temperature controller 5 is located outside the heating furnace 2 and includes six sets of temperature adjusters $5a$ to $5f$ which are connected, in series connection, to a given electric source of A.C. 100 V. As is seen in the drawing, the inner thermometer element $3x$ forms six sets of couples with the respective outer thermometer elements $3a$ to $2f$. That is, one terminal of the inner thermometer element $3x$ is connected, in parallel connection, to signal input terminals of the six sets of temperature adjusters $5a$ to $5f$, respectively. The other terminal of the inner thermometer element $3x$ is connected, in parallel connection, to terminals of the six sets of outer thermometer elements $3a$ to $3f$. The terminal of the outer thermometer element $3a$ is connected to the aforementioned signal input terminal of the temperature adjuster $5a$. In a similar manner, the terminals of the subsequent thermometer elements $3b$ to $3f$ are connected to the aforementioned signal input terminals of the corresponding temperature adjusters $5b$ to $5f$ too, respectively.

Inside the heating furnace 2 shown in FIG. 1A, there is provided a heater $4a$ disposed on an inside wall surface of the heating furnace 2 facing the surface $a$ of the hexahedral body 1, i.e. an inside wall surface confronting the outer thermometer element $3a$ on the body 1. In a same fashion, the other heaters $4b$ to $4f$ are disposed on the corresponding inside wall surfaces of the heating furnace 2 while confronting the corresponding outer thermometer elements $3b$ to $3f$ on the hexahedral body 1 to be heated.

As shown in FIG. 1B again, the heater $4a$ is connected to a signal output terminal of the corresponding temperature adjuster $5a$ of the temperature controller 5 so that the quantity of heat emitted by the heater $4a$ should be varied in reference to the gap between the temperature detected by the outer thermometer element $3a$ and that by the inner thermometer element $3x$. Independently from the aforementioned heater $4a$, the heater $4b$ is connected to a signal output terminal of the corresponding temperature adjuster $5b$ of the temperature controller 5 so that the quantity of heat emitted by the heater $4b$ should be varied in reference to the gap between the temperature detected by the outer thermometer element $3b$ and that by the inner thermometer element $3x$. Independently from the foregoing heaters $4a$ and $4b$, the heater $4c$ is connected to a signal output terminal of the corresponding temperature adjuster $5c$ of the temperature controller 5 so that the quantity of heat emitted by the heater $4c$ should be varied in reference to the gap between the temperature detected by the outer thermometer element $3d$ and that by the inner thermometer element $3x$. Independently from the foregoing heaters $4a$ to $4d$, the heater $4e$ is connected to a signal output terminal of the corresponding temperature adjuster $5e$ of the temperature controller 5 so that the quantity of heat emitted by the heater $4e$ should be varied in reference to the gap between the temperature detected by the outer thermometer element $3e$ and that by the inner thermometer element $3x$. Finally, in independence of the foregoing heaters $4a$ to $4e$, the heater $4f$ confronting the outer thermometer element $3f$ is connected to the corresponding temperature adjuster $5f$ of the temperature controller 5 so that the quantity of heat emitted by the heater $4f$ should be varied in reference to the gap between the temperature detected by the outer thermometer element $3f$ and that by the inner thermometer element $3x$.

The temperature control operation by the apparatus of the present invention having the above described structure will hereinafter be explained in more detail, reference being made to the graphical illustration given in FIG. 2. In the drawing, locational temperature T of the hexahedral body 1 is marked on the ordinate while the heating time HT is marked on the abscissa. As an example, the time-functional temperature variations at the locations of the outer thermometer element $3a$ and of the inner thermometer element $3x$ are presented in the drawing. Namely, the curve marked as "$3a$" shows the time-functional variation of the temperature detected by the outer thermometer element $3a$ disposed on the surface $a$ of the hexahedral body 1 and the curve marked as "$3x$" shows the time-functional variation detected by the inner thermometer element $3x$ disposed near the center of the hexahedral body 1, the hexahedral body 1 being placed within the heating furnace 2.

In the beginning, the heaters $4a$ to $4f$ provided inside are electrically energized for the heating of the body 1 by the electric source of A.C. 100V via the temperature controller 5. Being heated by the heater 4a, for example, the temperature of the surface a of the body 1 escalates gradually while the escalation of the temperature of the center part of the body 1 is somewhat delayed due to heat inertia of the body 1.

Consequently, as the heating goes on, there appears temperature gap $\Delta T$ in FIG. 2 between the surface and center temperatures of the body 1 under heating. In the case of the couple 3a vis. 3x, this temperature difference $\Delta T$ is brought into the temperature adjuster 5a of the temperature controller 5 as an input signal. The same takes place regarding the other outer thermometer element vis. the inner thermometer couples also. In the temperature controller 5, the respective temperature adjusters 5a to 5f are provided with prescribed temperature gap reference inputs which are of allowable magnitude regarding the body 1 to be heated in the heating furnace 2. For example, provided that the allowable limit of the temperature gap is selected at 20°C, i.e. the temperature adjusters 5a to 5f are provided with the temperature gap reference inputs of 20°C, the quantity of heat emitted by the heater 4a is reduced automatically when the temperature gap detected by the couple 3a vis. 3x approaches 20°C. When the temperature gap detected by the couple 3a vis. 3x lowers far below 20°C, the quantity of heat emitted by the heater 4a is increased automatically. Consequently in the case of the example shown in FIG. 2, when the temperature gap T detected by the couple composed of the outer thermometer element 3a disposed on the surface a of the body 1 and the inner thermometer element 3x disposed near the center of the body 1 approaches 20°C, the temperature adjuster 5a so functions that the quantity of heat emitted by the heater 4a is reduced. Mean while the temperature near the center part x of the body 1 escalated and, in accordance with this temperature escalation of the center part x of the body 1, the temperature gap $\Delta T$ decreases gradually. This reduction in the temperature gap $\Delta T$ induces corresponding operation of the temperature adjuster 5a to increase the quantity of heat emitted by the heater 4a which is connected to the temperature adjuster 5a. In response to this increase in the quantity of heat emitted by the heater 4a, the surface temperature of the body 1 escalates and the temperature gap $\Delta T$ detected by the couple 3a vis. 3x approaches 20°C again. In this manner, the temperature of the body 1 is escalated to the prescribed level, the temperature gap $\Delta T$ being always kept smaller than 20°C. Similar processes are carried out regarding the other couples, temperature adjusters and heaters. Therefore, at every point of the body, the temperature of same is escalated to the prescribed level while the temperature gaps are always maintained smaller than 20°C.

A general explanation has been made in the foregoing paragraphs to the composition, operation and effect of the present invention. The method and apparatus of the present invention is particularly and desirably employed in the brazing process of aluminum material or its alloys. In the case of such brazing processes, the melting point temperature of the brazing material is very close to that of the material to be brazed and, due to this closeness in the melting point temperature, it is greatly desired to obviate possible local heating or severe heating. Further, heat treatment in such processes needs to be carried out within a vacuum furnace in order to prevent the undesirable formation of oxidized metal layers on the material surfaces.

Application of the present invention to one example of such brazing processes will hereinafter to explained in detail in reference to the illustration shown in FIG. 3. The elements shown in FIG. 3 are substantially similar in their structures and functions to the elements shown in FIG. 2 and marked with same reference symbols. However, in order to provide the temperature controller 5 with improved function for effectively controlling the heating process of aluminum material, the temperature adjusters 5a to 5f are accompanied with three kinds of temperature adjuster circuits, respectively. In accordance with the type of the heating process, the three temperature adjuster circuits are selectively made operative in reference to the prescribed temperatures which will be later explained in detail.

It is known that the optimum brazing temperature for aluminum material is around 600°C. During the initial heat escalation procedure up to about 550°C, the first temperature adjuster circuit is brought into effective operation.

During this procedure, the quantity of heat emitted by the heaters is so adjusted that the temperature gap between the surfaces and the center part of the body 1 does not exceed 20°C, thereby the heat escalation rate being so settled that the surface temperature of the body does not rise extremely. For the intermediate heat escalation procedure from 500° through 550°C, the second heat adjuster circuit operates and the quantity of heat emitted by the heaters is so adjusted that the aforementioned temperature gap does not exceed 5°C. In the last heat escalation procedure from 550° through 600°C, the third heat adjuster circuit of the known P.I.D. control type operates. Through the foregoing two staged heat escalation procedures, both the surface temperature and the center part temperature of the body approach the desired ultimate temperature while being relatively close to each other. For this reason, it is possible to employ the ordinary temperature control technique based on the surface temperature measurement for this last temperature escalation procedure.

For this purpose, there is provided a recorder 7 in connection with the surface thermometer elements 3'a to 3'f and the center part thermometer element 3'x. The recorder 7 is connected for signal transmission to the temperature 5 via a connection 8. Prescribed temperatures for switching the above mentioned three temperature adjuster circuits are set in advance in the recorder 7. When the surface temperature of the body 1 detected by the surface thermometer elements 3'a to 3'f arrives at the aforementioned prescribed switching temperatures, corresponding signals are fed from the recorder 7 to the temperature controller 5 via the connection so as to cause corresponding switching of the temperature adjusters 5a to 5f. Switches 6a to 6f are provided in order to switch the terminal of the respective thermometer elements from the measurement of the temperature gap between the surfaces and the center part of the body 1 to the measurement of the surface temperature only.

In this way, the heating operation of the aluminum material is carried out. In the first stage of the heating process in which the surface temperature of the aluminum material is escalated up to 500°C, both the surface temperatures of the body and the center part temperature of the body are sensed by the thermometer elements 3a to 3f and 3x, respectively and the first temperature adjuster circuits of the temperature adjusters 5a to 5f so operates as to keep the gap between the surface temperature and the center part temperature smaller than 20°C, thereby the quantities of heat emitted by the heaters 5a to 5f are properly adjusted. As a result of such temperature gap control, the aluminum material body is heated quickly up to 500°C temperature without causing undesirable local heating.

Surface temperatures of the aluminum material body are recorded in the recorder 7 via the surface thermometer elements 3'a to 3'f. When the respective surface temperatures arrive at 500°C, the corresponding signal is fed from the recorder 7 to the temperature controller 5 via the connection 8. Upon receipt of such signal, the second temperature adjuster circuits of the respective temperature adjusters 5a to 5f come in charge of the temperature detection while the first temperature adjuster circuits are made inoperative. Following this switching of the temperature adjuster circuits in the respective temperature adjusters 3a to 3f, the temperature of the aluminum body is so escalated that the quantity of heat of the respective heaters 4a to 6f is so adjusted as to result in a very uniform temperature distribution over the aluminum material body. In this fashion, the temperature of the aluminum material body 1 is escalated up to 550°C. Upon arrival at the surface temperatures of 550°C, the recorder 7 again produces a corresponding signal which is to be fed to the temperature controller 5, thereby the temperature gap sensing terminals of the respective thermometer elements connected to the corresponding temperature adjusters 5a to 5f are switched by the switches 6a to 6f so that they are connected to the surface temperature sensing terminals of the respective thermometer elements. Simultaneously the respective temperature adjusters are brought into connection to the third temperature adjuster circuits. As a result of this switching, the control of the quantities of heat emitted from the respective heaters 4a to 4f on the basis of the temperature gap between the surface and the center part of the body is cancelled. Thereafter, the control of the qualities of heat emitted by the respective heater is carried out in reference to the surface temperatures of the body only.

As already explained, the known P.I.D. control system is applied to the third temperature adjuster circuits, a very precise control of the temperature can be expected for in the present invention. For example, a sufficient control of the body temperature can be expected for with a variation in the temperature distribution of 5°C or smaller.

In the manner above described, the aluminum material body can be heated up to the temperature of 600°C with a closeness between the surface temperatures and the center part temperature and without the danger of the undesirable local heating. Consequently the brazing operation of the aluminum body can be performed very effectively, the temperature control being extremely precise. Such precise temperature control in the brazing process assures production of high quality products. Further, upon arrival of the actual body temperature at the prescribed thermal level, the supply of heat to the heaters is cancelled as in the conventional brazing processes. In this connection, the temperature controller 5 so functions that the temperature of the body is maintained near the prescribed reference input temperature level.

Application of the present invention is not limited to the heating process of aluminum material bodies. That is, the present invention is desirably applicable to the case also in which bodies of complicated shapes are to be heated. Selection of the temperature gap between the surface temperatures and the center part temperature of the body can be set as desired in reference to the fashion of the heating treatment.

Further, it is also employable in the present invention that the apparatus is provided with a number of multi-staged temperature adjuster circuits in accordance with the time-functional pattern of the heating process in such a manner that the higher is the body temperature, the smaller is the temperature gap between the surfaces and the center part of the body. Through employment of such an adjustment of the quality of heat emitted from the heaters, a more precise and more uniform control of the heating process can be carried out. In addition to this, such precise and uniform control of the heating process can be very easily and simply performed when the concept of the present invention is employed. Further, the heating process on the basis of the present invention causes no undesirable deformation of the bodies to be heated, no waste of the quality of heat and reduced loss in the cost needed for the heating process.

What is claimed is:

1. The method of brazing a body of aluminum or an alloy thereof comprising the steps of:
   heating said body in a vacuum furnace by radiant heat from a plurality of sources arranged exteriorly of said body in three successive stages having temperature ranges of successively higher temperature limits;
   measuring the surface temperature of said body at positions facing said sources, respectively;
   measuring the temperature of said body interiorly thereof at a location to register substantially maximum temperature differences between said positions and said location;
   detecting the difference in temperature between said positions and said location, respectively;
   applying each said detected difference as a signal in control of a said heat source facing a said position individual thereto;
   altering the control factor governing the rate of heating when the temperature at each said position reaches an upper limit of a first said range to thereafter reduce the heating rate, and
   further altering said heating rate as the temperature at each said position reaches an upper limit in the second said range, in a degree to progressively reduce the temperature rise rate as the upper limit of said third range is approached.

2. The method of claim 1 wherein said upper limit of said third range is below the melting point for said body and above the melting point of a brazing substance in contact therewith, said upper limit of said first range being a temperature below the melting point of said brazing substance.

3. The method of claim 1 wherein said first range has an upper limit substantially at 500° C, said second range having said upper limit at substantially 550°C. and said third range having said upper limit at substantially 600°C., said temperature differences in said first range being separately controlled as not to exceed 20° C., said differences in said second range being individually controlled to not over 5°C.

4. The method of claim 3 wherein said altered heating rates for said third range are controlled individually by the differences in surface temperatures detected and the upper limit of said third range substantially independently of the temperature at said interior location.

5. Apparatus for brazing a complex body of aluminum or its alloys enclosed in a vacuum furnace for radiant heating thereof, comprising,
a plurality of heater elements disposed in said furnace around said body,
at least one temperature detector located within said body comprising means for detecting a central temperature therein, a plurality of temperature detectors positioned one on each of a plurality of sides of said body and facing said elements respectively; comprising means for detecting surface temperatures of the body,
means connecting said central temperature detector and each of said surface temperature detectors for providing a signal representing the difference temperatures, respectively,
temperature rising rate adjusting means individually responsive to said signals for controlling said heater elements,
switching means for each said adjusting means for controlling operation thereof according to one said detected temperature.

6. Apparatus according to claim 5, further means for detecting a plurality of temperature limits at each said surface position, and
means for varying the control of said heater elements individually each at rates differing according to a said signal.

7. Apparatus according to claim 6, including means for varying the control of each heater element in accordance with said signal in control thereof differently above and below one said limit, so reducing radiant heating therefrom as to maintain a smaller said signal when the said surface position temperature exceeds said limit.

8. Apparatus according to claim 6, said means for varying the control of each heater element including switch means for varying said control above and below a second said temperature limit, said switch means including means causing said control to shift from said signal indicating temperature difference between the central location and said surface positions to control according to surface temperature.

* * * * *